(12) United States Patent
Ueda et al.

(10) Patent No.: US 8,321,576 B2
(45) Date of Patent: Nov. 27, 2012

(54) METHOD AND APPARATUS OF DATA TRANSFER CONTROLLING DATA TRANSFER AMONG A PLURALITY OF EQUIPMENTS CONNECTED TO A NETWORK AND MEDIUM RECORDING THE PROGRAM THEREOF

(75) Inventors: Toru Ueda, Kyoto (JP); Satoshi Terada, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 878 days.

(21) Appl. No.: 11/287,209

(22) Filed: Nov. 28, 2005

(65) Prior Publication Data

US 2006/0075096 A1 Apr. 6, 2006

Related U.S. Application Data

(63) Continuation of application No. 09/492,154, filed on Jan. 27, 2000, now Pat. No. 7,003,577.

(30) Foreign Application Priority Data

Jan. 27, 1999 (JP) .................................. 11-018197

(51) Int. Cl.
*G06F 15/16* (2006.01)

(52) U.S. Cl. ......... 709/230; 709/231; 709/232; 709/233

(58) Field of Classification Search .................. 709/230, 709/231, 232, 233; 370/244, 552
See application file for complete search history.

(56) References Cited

U.S. PATENT DOCUMENTS

| 4,648,061 | A | | 3/1987 | Foster |
| 5,224,098 | A | | 6/1993 | Bird et al. |
| 5,519,852 | A | | 5/1996 | Noy |
| 5,535,334 | A | | 7/1996 | Merkley et al. |
| 5,630,101 | A | * | 5/1997 | Sieffert ........................... 710/11 |
| 5,848,415 | A | * | 12/1998 | Guck ............................ 707/831 |
| 5,881,240 | A | | 3/1999 | Asano |
| 5,913,041 | A | | 6/1999 | Ramanathan et al. |
| 5,966,451 | A | * | 10/1999 | Utsumi ........................... 380/51 |

(Continued)

FOREIGN PATENT DOCUMENTS

EP 0 883 270 A1 12/1998

(Continued)

OTHER PUBLICATIONS

Microsoft Press Computer Dictionary, 1997, Microsoft Press, p. 364.

*Primary Examiner* — Peter Shaw
(74) *Attorney, Agent, or Firm* — Birch, Stewart, Kolasch & Birch, LLP

(57) ABSTRACT

A data transfer apparatus includes an attribute collecting unit collecting attribute of data managed by an equipment connected to a network, a transfer control unit selecting a method of data transfer based on the attribute information of data collected by the attribute collecting unit, a data receiving unit receiving data by the method of transfer selected by the transfer control unit, and a data transmitting unit transmitting data by the method of transfer selected by the transfer control unit. As the transfer control unit selects the method of data transfer based on the data attribute information collected by the attribute collecting unit, it becomes possible for a user or an application program to receive data by the same operation.

24 Claims, 14 Drawing Sheets

U.S. PATENT DOCUMENTS

| | | | |
|---|---|---|---|
| 5,999,979 A | 12/1999 | Vellanki et al. | |
| 6,178,456 B1 | 1/2001 | Zhou et al. | |
| 6,195,677 B1 * | 2/2001 | Utsumi | 709/201 |
| 6,266,701 B1 | 7/2001 | Sridhar et al. | |
| 6,272,169 B1 * | 8/2001 | Boswell et al. | 375/222 |
| 6,285,659 B1 | 9/2001 | Feuerstraeter et al. | |
| 6,292,834 B1 | 9/2001 | Ravi et al. | |
| 6,415,313 B1 * | 7/2002 | Yamada et al. | 709/200 |
| 6,427,165 B1 | 7/2002 | Anderson | |
| 6,591,326 B1 * | 7/2003 | Ichikawa et al. | 710/316 |

FOREIGN PATENT DOCUMENTS

| | | |
|---|---|---|
| JP | 01228243 A | 9/1989 |
| JP | 05108512 A | 4/1993 |
| JP | 153185 | 6/1993 |
| JP | 176010 | 7/1993 |
| JP | 284567 | 10/1997 |
| JP | 10-290247 A | 10/1998 |
| JP | 11017738 A | 1/1999 |
| WO | WO-99/57837 | 11/1999 |

\* cited by examiner

METHOD AND APPARATUS OF DATA TRANSFER CONTROLLING DATA TRANSFER AMONG A PLURALITY OF EQUIPMENTS CONNECTED TO A NETWORK AND MEDIUM RECORDING THE PROGRAM THEREOF

This nonprovisional application is a continuation application of U.S. patent application Ser. No. 09/492,154 filed on Jan. 27, 2000 now U.S. Pat. No. 7,003,577 which claims priority under 35 U.S.C. §119 to Patent Application No(s). 11-018197 filed in Japan on Jan. 27, 1999, which are herein incorporated by reference.

BACKGROUND OF THE INVENTION

1. Field of the Invention

The present invention relates to a technique for controlling data transfer among equipments connected to a network. More specifically, the present invention relates to method and apparatus of data transfer controlling data transfer when a plurality of equipments having different protocols, command sets and the like are connected to a network, as well as to a medium recording the data transfer program.

2. Description of the Background Art

Along with widespread used of the Internet various application protocols used on the Internet have been developed. One of such application protocols is FTP (File Transfer Protocol) used on UNIX (registered trademark of AT&T).

FTP is an application protocol operating on IP (Internet Protocol) as a lower layer, aimed to enable sharing of files, and it enables effective implementation of reliable data transfer while not revealing differences among various file systems. Basically, FTP is for transmitting/receiving a set of statistically recorded files, that is, data of which contents do not change with time between computers. FIG. 1 is a screen shot representing an exemplary use of the FTP (a screen shot of FTP Explorer on Windows 95 (registered trademark of Microsoft)).

In EPG (Electric Program Guide) selecting and receiving a title or the like of broadcast programs, characters or icons representing titles, channels and the like are displayed on a screen, and when a title or a channel is selected by a remote controller or the like, corresponding broadcast starts. This corresponds to selection of data from hierarchical menu of a cable television, for example. In this case, the data is stream data of digital broadcast transmitted together with time information. Therefore, the data is of different nature from the data of the files such as described above which are stored and can be received at any time.

According to FTP described above, what is necessary is simply to transmit a file from a transmitting side computer to a receiving side computer, and therefore only one type of transfer method is used. According to EPG, when a broadcast channel is selected by a tuner of the receiving side, stream data corresponding to the channel is received by the tuner. In the reception of the stream data, only one type of transfer method is used. It should be noted, however, that different data format is used dependent on the type of the data to be transmitted, that is, music, data or video images, for example.

In this manner, even when there are a plurality of data forms to be transmitted/received by equipments connected to the network, transmission/reception for the file or for the stream data only has been done, dependent on whether the object of access is a file or stream data. More specifically, there has been no problem in file transfer between computers or reception of TELEVISION programs in the prior art where the method of transfer is uniquely determined dependent on the application. When various equipments including a personal computer, an audio visual equipment and other home use electric equipments are connected to a network, however, the data transmitted/received within the network include various data of different natures, such as files, stream data of reception data of TELEVISION broadcast, commands controlling equipments connected to the network, user interface information and so on. Therefore, it is impossible to uniquely determine the method of transfer, making data transmission/reception difficult.

In transmitting/receiving motion picture data, different command sets may be used among a tuner for receiving broadcast, a DVD (Digital Versatile Disc), a VCR (Video Cassette Recorder) and so on, and an appropriate command set must be selected for transmitting/receiving motion picture data through the network. In order to transmit/receive data of different natures, it is necessary to use different applications, different protocols and to select different command set, and there has been no method allowing integral handling of such data having different natures.

Japanese Patent Laying-Open Nos. 5-176010, 5-153185 and 9-284567 disclosed related techniques.

According to the invention disclosed in Japanese Patent Laying-Open No. 5-176010, when an integrated document is to be transferred through a telephone network, a protocol is automatically selected for transfer processing, based on an identifier of each file constituting the integrated document. The protocol is selected, however, not considering protocols which can be handled by the receiving side equipment, but based on the nature of the file to be transferred by the transmitting side equipment.

According to the invention disclosed in Japanese Patent Laying-Open No. 5-153185, when an application program of a first node and an application program of a second node exchange data and protocols assumed by respective application programs differ, a protocol compensating function compensates for the difference. The compensating function enables development of an application program not taking into account the protocol of the counterpart or object of transmission, and it becomes unnecessary for the user to recognize difference in protocols. It is necessary, however, to prepare the compensating function for all possible combinations of the protocols. This makes the compensation function complicated.

According to the invention disclosed in Japanese Patent Laying-Open No. 9-284567, a server receives attribute information representing a protocol, a communication transfer rate and the like from a terminal through a network, and notices to an encoder. Based on the attribute information, the encoder encodes voice information, image information or the like having real-time nature, and thereafter, the server transmits the coded information to the terminal through the network. More specifically, the invention relates to a technique for encoding data having real-time nature using an encoder, so as to ensure appropriate transfer rate. This reference, however, does not describe any technique related to files not containing time information or switching of command sets for controlling equipments.

Even when the prior art technique described above are used, a method of integrally handling data of different natures described above cannot be realized.

SUMMARY OF THE INVENTION

An object of the present invention is to provide method and apparatus of data transfer enabling data reception from equipments operating on different transfer methods connected to a network through same operation, as well as to a medium recording the data transfer program.

Another object of the present invention is to provide method and apparatus of data transfer enabling data transmission to equipments of different transfer methods connected to a network through same operations, as well as to provide a medium recording the data transfer program.

A still further object of the present invention is to provide method and apparatus of data transfer enabling data transfer control among equipments of different transfer methods connected to a network, as well as to provide a medium recording the data transfer program.

According to an aspect of the present invention, the data transfer apparatus includes an attribute information acquiring unit acquiring attribute information of data managed by an equipment connected to a network, a transfer selecting unit selecting method of data transfer based on the attribute information of the data acquired by the attribute information acquiring unit, and a data receiving unit receiving data through the method of transfer selected by the transfer selecting unit.

As the transfer selecting unit selects the method of data transfer based on the attribute information of the data acquired by the attribute information acquiring unit, it becomes possible for a user or an application program to receive data by the same operation.

According to another aspect of the present invention, the data transfer apparatus includes an attribute information acquiring unit acquiring attribute information of data managed by an equipment connected to a network, a transfer selecting unit selecting a method of data transfer based on the attribute information of the data acquired by attribute information acquiring unit, and a data transmitting unit transmitting data through the method of transfer selected by the transfer selecting unit.

As the transfer selecting unit selects the method of data transfer based on the attribute information of the data acquired by the attribute information acquiring unit, it becomes possible for a user or an application program to transmit data by the same operation.

According to a still further aspect of the present invention, the data transfer apparatus includes: an equipment attribute information acquiring unit acquiring attribute information of an equipment connected to a network, an equipment attribute information selecting unit selecting attribute information of first and second equipments among equipment attribute information acquired by the equipment attribute information acquiring unit; a data attribute information acquiring unit acquiring attribute information of data managed by the first equipment selected by the equipment attribute information selecting unit; a transfer selecting unit selecting a method of data transfer based on the data attribute information acquired by the data attribute information acquiring unit and on the attribute information of the second equipment, and a data transfer instructing unit instructing data transfer from the first equipment to the second equipment in accordance with the method of transfer selected by the transfer selecting unit.

As the data transfer instructing unit instructs data transfer from the first equipment to the second equipment by the method of transfer selected by the transfer selecting unit, it becomes possible to control data transfer between equipments having different methods of transfer connected to the network.

According to a still further aspect of the present invention, the method of data transfer includes the steps of acquiring attribute information of data managed by an equipment connected to a network, selecting method of data transfer based on the acquired attribute information of the data, and receiving data by the selected method of transfer.

As the method of data transfer is selected based on the acquired attribute information of the data, it becomes possible for a user or an application program to receive data by the same operation.

According to a still further aspect of the present invention, the method of data transfer includes the steps of acquiring attribute information of data managed by an equipment connected to a network, selecting a method of data transfer based on the acquired attribute information of the data, and transmitting data by the selected method of transfer.

As the method of data transfer is selected based on the acquired attribute information of the data, it becomes possible for a user or an application program to transmit data by the same operation.

According to a still further aspect of the present invention, the method of data transfer includes the steps of acquiring attribute information of an equipment connected to a network, selecting attribute information of first and second equipments among acquired equipment attribute information, acquiring attribute information of data managed by the selected first equipment, selecting a method of data transfer based on the acquired data attribute information and the attribute information of the second equipment, and instructing data transfer from the first equipment to the second equipment by the selected method of transfer.

As data transfer from the first equipment to the second equipment by the selected method of transfer is instructed, it becomes possible to control data transfer between equipments having different methods of transfer connected to the network.

According to a still further aspect, the present invention provides a computer readable recording medium recording a program enabling a computer to execute a method of data transfer, wherein the method includes the steps of acquiring attribute information of data managed by an equipment connected to a network, selecting a method of data transfer based on the acquired attribute information of the data, and receiving the data by the selected method of transfer.

As the method of data transfer is selected based on the acquired attribute information of the data, it becomes possible for a user or an application program to receive data by the same operation.

According to a still further aspect, the present invention provides a computer readable recording medium recording a program enabling a computer to execute a method of data transfer, wherein the method includes the steps of acquiring attribute information of data managed by an equipment connected to a network, selecting a method of data transfer based on the acquired attribute information of the data and transmitting the data by the selected method of transfer.

As the method of data transfer is selected based on the acquired attribute information of the data, it becomes possible for a user or an application program to transmit data by the same operations.

According to a still further aspect, the present invention provides a computer readable recording medium recording a program enabling a computer to execute a method of data transfer, wherein the method includes the steps of acquiring attribute information of an equipment connected to a network, selecting attribute information of first and second equipments among acquired equipment attribute information, acquiring attribute information of data managed by the selected first equipment, selecting a method of data transfer based on the acquired attribute information of the data and on the attribute information of the second equipment, and instructing data transfer from the first equipment to the second equipment by the selected method of transfer.

As data transfer from the first equipment to the second equipment by the selected method of transfer is instructed, it becomes possible to control data transfer between equipments having different methods of transfer connected to the network.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The data transfer apparatus in accordance with an embodiment operates incorporated in various equipments (computer, DVD, television and the like) connected to a network. Though an example in which the data transfer apparatus is incorporated in a computer will be described in the following, the description is not limiting.

Figure 1:
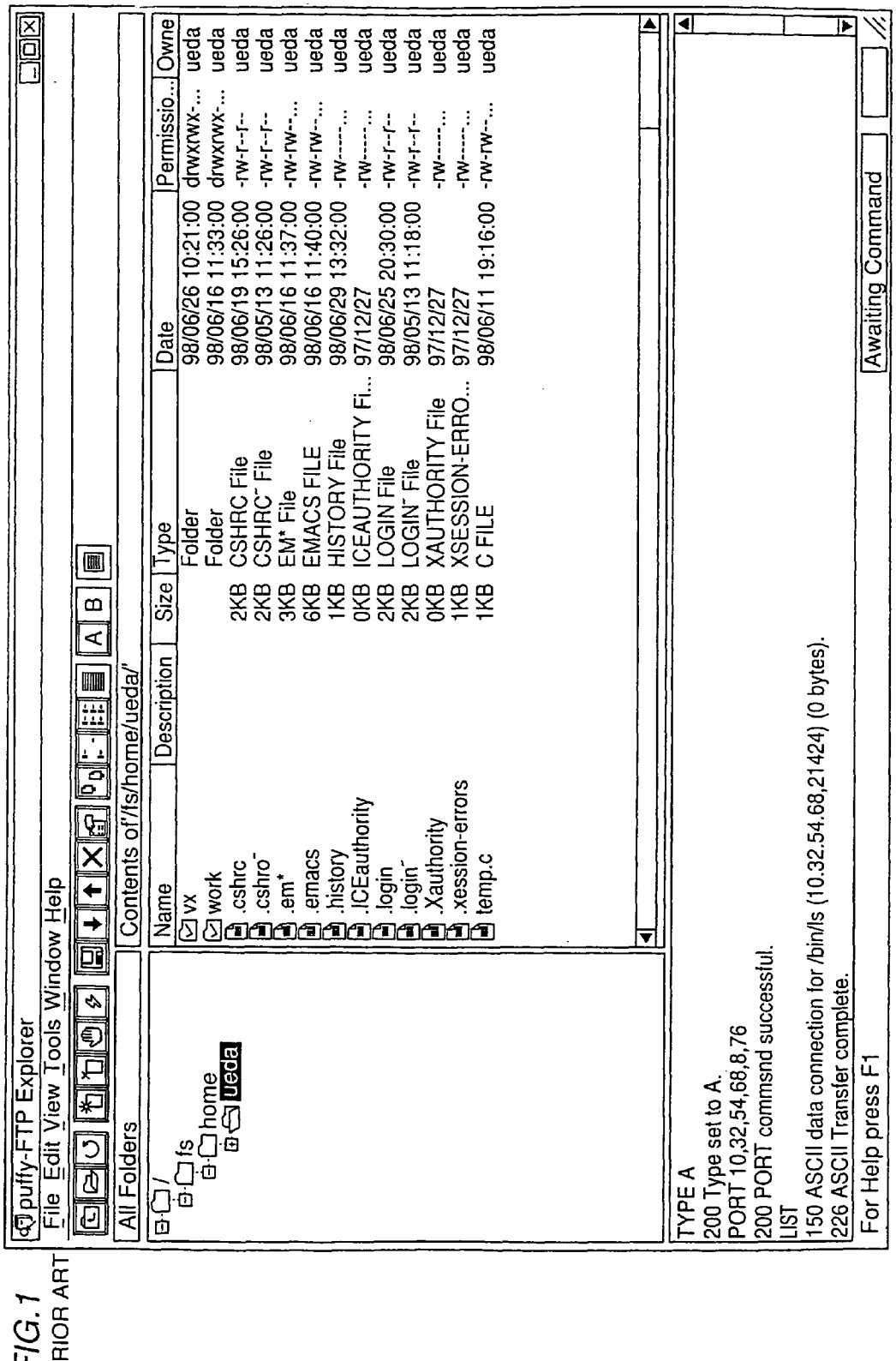
FIG. 1 represents an exemplary screen shot of the conventional FTP.
Figure 2:
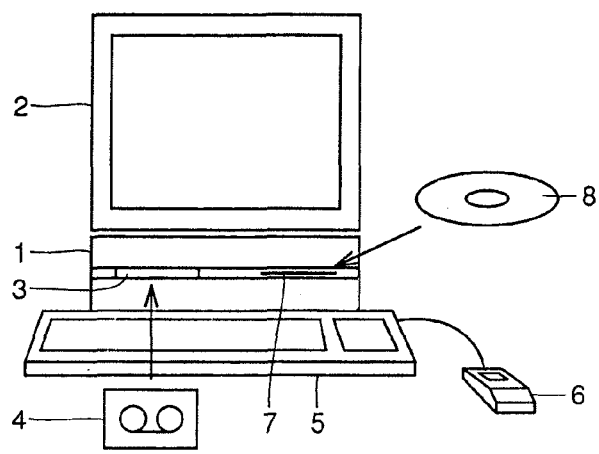
FIG. 2 shows an appearance of a computer incorporating a data transfer apparatus in accordance with an embodiment of the present invention.

Referring to FIG. 2, the computer in which the data transfer apparatus is incorporated includes a computer body 1, a graphic display apparatus 2, a magnetic tape drive 3 to which a magnetic tape 4 is loaded, a keyboard 5, a mouse 6, and a CD-ROM drive 7 to which a CD-ROM (Compact Disc-Read Only Memory) 8 is loaded. The data transfer apparatus (data transfer program) is supplied by a storing medium such as magnetic tape 4, CD-ROM 8 or the like. The data transfer program is executed by computer body 1, and an operator transfers data by operating keyboard 5 or mouse 6 while monitoring graphic display apparatus 2. The data transfer program may be supplied to computer body 1 through a network from other computer.

Figure 3:
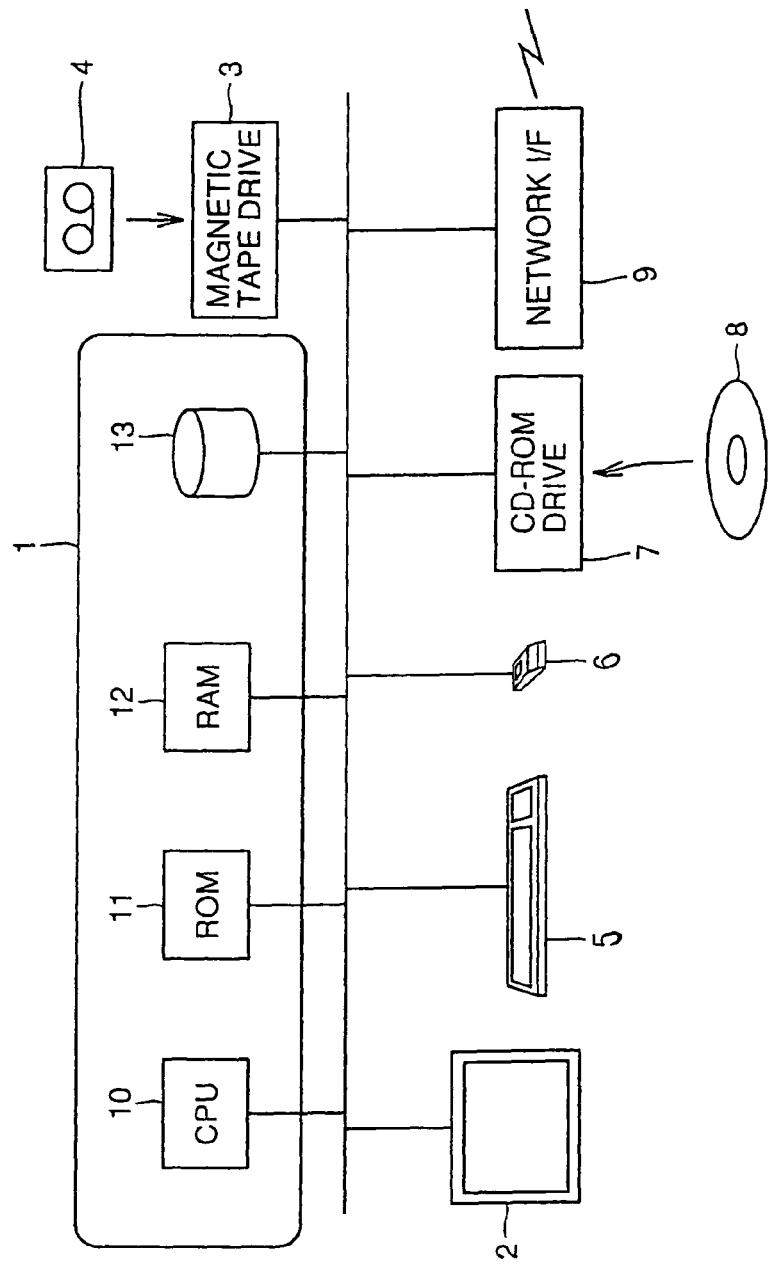
FIG. 3 is a block diagram representing an example of a computer configuration incorporating the data transfer apparatus in accordance with an embodiment of the present invention.

FIG. 3 is a block diagram representing an example of a configuration of a computer in which the data transfer apparatus of the present invention is incorporated. Computer body 1 shown in FIG. 2 includes a CPU (Central Processing Unit) 10, an ROM (Read Only Memory) 11, an RAM (Random Access Memory) 12 and a hard disk 13. CPU 10 processes while communicating data with graphic display apparatus 2, magnetic tape drive 3, keyboard 5, mouse 6, CD-ROM drive 7, a network I/F (interface) 9, ROM 11, RAM 12 or hard disk 13. The data transfer program recorded on magnetic tape 4 or CD-ROM 8 is once stored in hard disk 13 through magnetic tape drive 3 or CD-ROM drive 7, by the control of CPU 10. CPU 10 loads the data transfer program to RAM 12 appropriately from hard disk 13 and executes the program for data transfer.

Figure 4:
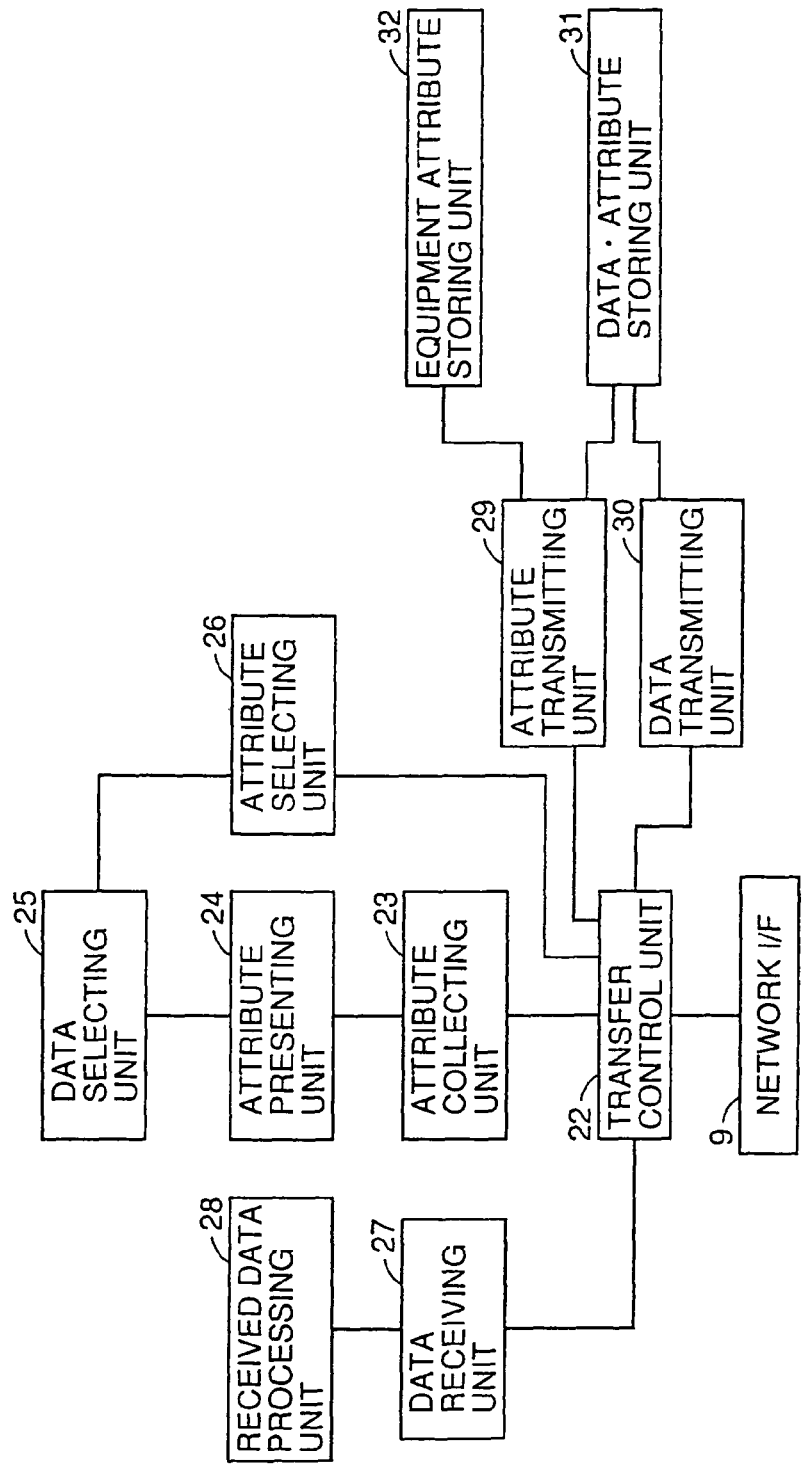
FIG. 4 is a schematic block diagram representing a configuration of the data transfer apparatus in accordance with one embodiment of the present invention.

FIG. 4 is a block diagram representing a schematic configuration of a data transfer apparatus in accordance with the embodiment of the present invention. The data transfer apparatus includes: a network I/F 9 for communication with external equipments through the network; a transfer control unit 22 controlling switching of communication protocols such as asynchronous transfer and synchronous transfer, switching of command sets, and transmission/reception of data, attribute information and the like; attribute collecting unit 23 collecting attribute of data managed by equipments connected to the network, attributes of the equipments, attributes of data managed by the data transfer apparatus itself and attributes of data transfer apparatus itself; an attribute presenting unit 24 presenting attributes and the like of the data and equipments to the user or the application program; a data selecting unit 25 selecting data among the data presented by attribute presenting unit 24; an attribute selecting unit 26 selecting the attribute of the data selected by data selecting unit 25 among the attributes of all the data and equipments presented by attribute presenting unit 24; a data receiving unit 27 receiving data through network I/F 9; a received data processing unit 28 processing the data received by data receiving unit 27; an attribute transmitting unit 29 transmitting attribute in response to a request by an equipment connected to the network or to a request by the data transfer apparatus itself; a data transmitting unit 30 transmitting data in response to a request from an equipment connected to the network or a request by the data transfer apparatus itself; a data attribute storing unit 31 storing data and data attribute; and an equipment attribute storing unit 32 storing attributes of equipments connected to the network.

The attribute described above refers to information for defining protocol, command set, application or information to be selected by the user or the application. The data attribute refers to file name, data format, data size, icon, protocol, description of contents and the like. The equipment attribute refers to information representing an equipment connected to the network or a specific function of the equipment, including general name of the equipment (VCR (Video Cassette Recorder), tuner or the like), a processable protocol, functions of the equipment (if the equipment is a television, functions of a tuner, a monitor, speaker and the like, and if the equipment is a cam encoder, functions of a video camera, VCR and the like) and present status (reproducing, recording and the like). In accordance with IEEE1394, for example, a tuner and a VCR may have different command sets even when the same motion picture data is handled.

When presenting attribute to the user, attribute presenting unit 24 presents a display of the name of the data, file type and the like on graphic display apparatus 2. The user selects data to be transferred, using selecting unit 23, among the plurality of data displayed on graphic display apparatus 2. When presenting attributes to other application program, attribute presenting unit 24 transfers the name of the data, file type and the like to the object application program.

Data selecting unit 25 controls keyboard 5 or mouse 6 so as to select the attribute desired by the user, among the attribute data displayed on graphic display apparatus 2. Received data processing unit 28 performs processing such as reproduction of video image or voice from the received data and storing a file in a storage medium.

Figure 5:
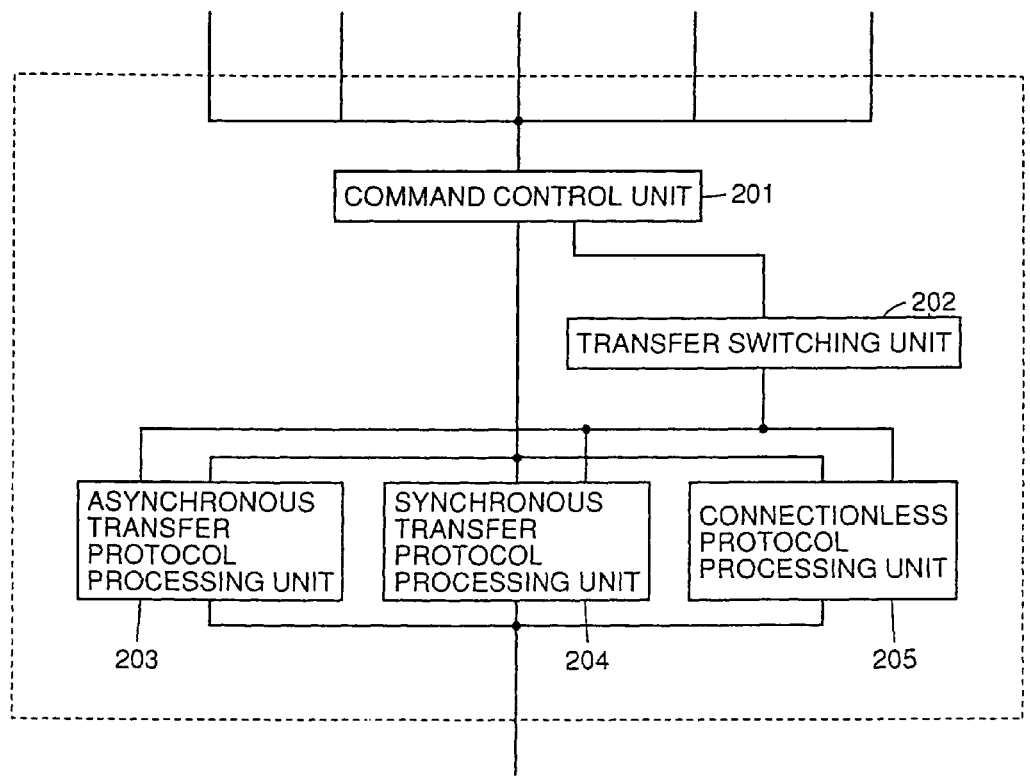
FIG. 5 is a block diagram showing details of a transfer control unit 22.

FIG. 5 is a block diagram representing details of transfer control unit 22 shown in FIG. 4. Transfer control unit 22 includes: a command control unit 201 controlling collection of attributes from various equipments connected to the network, transmission/reception of data and so on; an asynchronous transfer protocol processing unit 203 establishing a logic communication path called a connection, for transmitting/receiving data; a synchronous transfer protocol processing unit 204 transmitting/receiving data in accordance with a synchronous transfer protocol; a connectionless protocol processing unit 205 transmitting/receiving data, though by asynchronous transfer, without establishing a connection; an asynchronous transfer protocol processing unit 203; and a transfer switching unit 202 switching between synchronous transfer protocol processing unit 204 and connectionless protocol processing unit 205.

Command control unit 201 is connected to attribute collecting unit 23, attribute selecting unit 26, data receiving unit 27, attribute transmitting unit 29 and data transmitting unit 30. Command control unit 201 receives attribute information from various equipments connected to the network in response to an attribute collection request from attribute collecting unit 23 and provides the information to attribute collecting unit 23, and transmits attribute information of the data transfer apparatus itself output from attribute transmitting unit 29 to equipments connected to the network. Command control unit 201 selects appropriate protocol and command set based on the selected equipment or data attribute information, and performs data communication between the equipment connected to the network and the data receiving unit 27 or data transmitting unit 30. In the data transfer apparatus in accordance with the present embodiment, the data transmitted/received between the equipment connected to the network and the data receiving unit 27 or data transmitting unit 30 all pass through command control unit 201. The data may be directly transmitted/received between data receiving unit 27 or data transmitting unit 30 and asynchronous transfer protocol processing unit 203, synchronous transfer protocol processing unit 204 or connectionless protocol processing unit 205, not through command control unit 201.

Synchronous transfer protocol processing unit 204 transmits/receives data in accordance with a protocol which guarantees transmission/reception of a prescribed amount of data within a prescribed time period without fail, with a prescribed bandwidth secured. Connectionless protocol processing unit 205 transmits/receives data packet by packet without establishing a connection. In accordance with IEEE1394 specifying a high speed serial bus, data transfer is possible both by asynchronous transfer and synchronous transfer. In the Internet, data transfer is possible both by asynchronous transfer and synchronous transfer, as bandwidth can be secured by resource reservation protocol, for example. Therefore, it is important to transmit/receive data while switching protocol processing units 203 to 205 by transfer switching unit 202.

Figure 6:
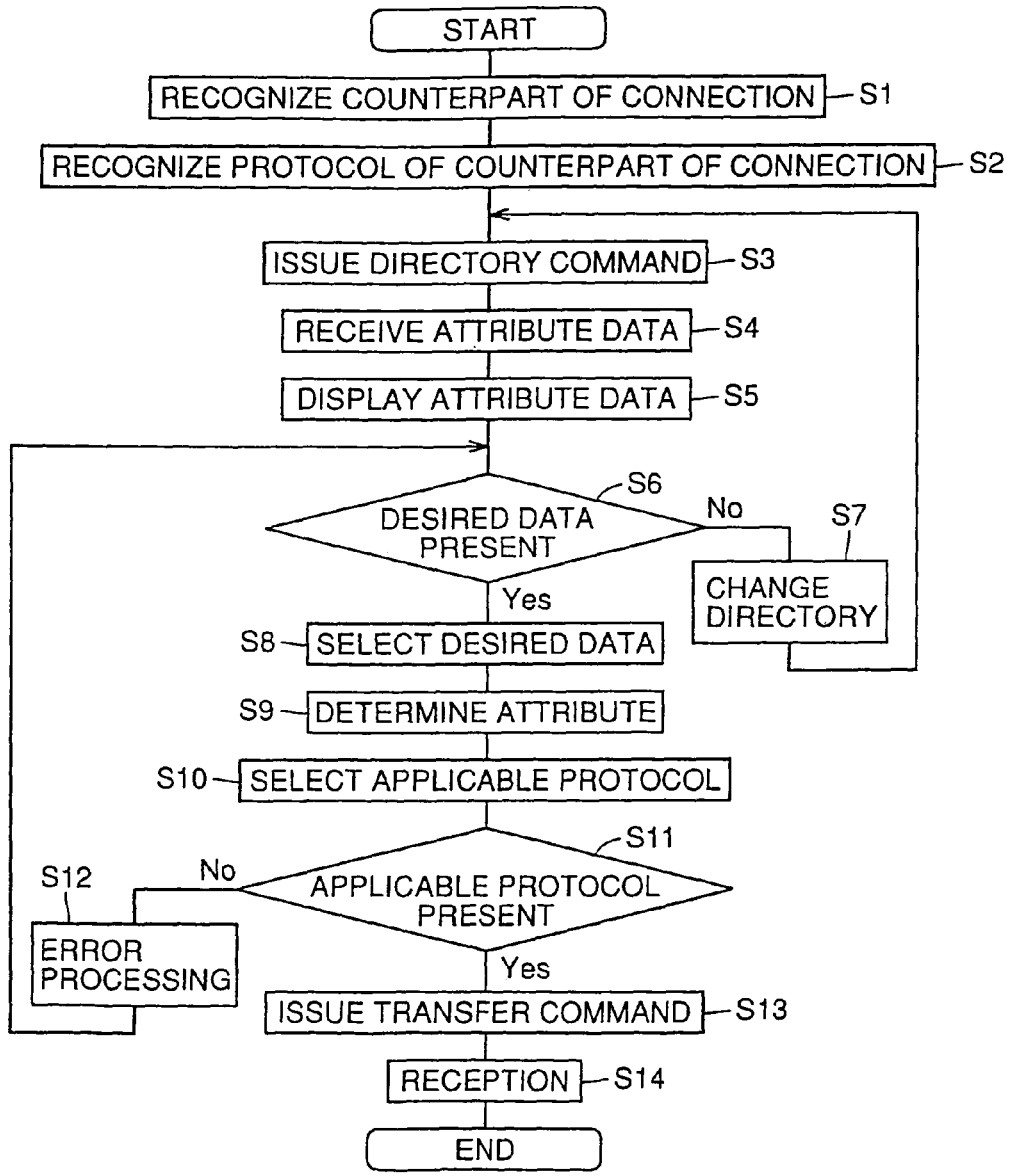
FIG. 6 is a flow chart representing a process procedure of command transmission in the data transfer apparatus in accordance with one embodiment of the present invention.

FIG. 6 is a flow chart representing a process procedure of command transmission (data reception) of the data transfer apparatus in accordance with an embodiment of the present invention. First, an equipment connected to the network is recognized (S1). The method of recognizing an equipment connected to the network differs by network or bus. For example, the equipment may be recognized by the user designating an object of connection by physical address or logical address, or the equipment may be recognized by detecting connection or disconnection of an equipment on the network based on an event generated when the equipment is connected/disconnected. Various methods have been known, and hence detailed description thereof is not given here.

Thereafter, transfer control unit 22 recognizes the protocol of the equipment of the object of connection (S2). This process is to recognize what can be used as the minimum common protocol between the data transfer apparatus and the equipment of the object of connection. For example, according to IEEE1394, by directly reading information of the equipment itself recorded on an ROM provided in the equipment or by directly reading information of protocol, common set and the like, the protocol of the equipment can be recognized. In a situation where common protocol can be used with the counterpart equipment, that is, the equipment of the object of connection, the process of step S2 is unnecessary.

Thereafter, transfer control unit 22 issues a directory command using the common protocol to obtain attribute of data of the counterpart equipment (S3), receives all or part of the attributes of data of the counterpart equipment and outputs the received attribute to attribute collecting unit 23 (S4). The directory command refers to a command requesting transmission of all or part of the data attributes of the counterpart equipment. According to IEEE1394 described above, contents of the ROM contained in the counterpart equipment can be read, and hence all data attributes can be obtained.

Thereafter, attribute presenting unit 24 displays the received attribute data (S5). Dependent on the data or equipment which is the object of connection, the form for holding attribute may differ. Therefore, the form is changed as needed and displayed in uniform manner. When the attribute data is to be presented to the application, the presenting unit converts the attribute data to a data format determined by the application and outputs the same.

Thereafter, whether necessary data is included in the attribute data displayed by attribute presenting unit 24 is determined (S6). Separate attribute data are displayed by icons, or the attribute data are displayed with numerals by attribute presenting unit 24, and the user selects the attribute data. When the attribute data is presented to the application, a desired attribute data is selected by the application. When the desired attribute data is not included therein (S6, No), a directory change command is issued (S7), the flow returns to step S3 and a directory command is issued. When a desired attribute data is included (S6, yes), attribute selecting unit 26 selects one or a plurality of attribute data (S8).

Thereafter, command control unit 201 determines, by determining the attribute of the data selected by attribute selecting unit 26, what attribute the data has (S9). Command control unit 201 switches transfer switching unit 202 based on the result of determination, and selects a protocol for data transfer (S10). Command control unit 201 not only selects the protocol for transmitting/receiving data of a motion picture and the like, but also transmits the motion picture actually to the network, or issues a control command for stopping data transmission.

Thereafter, whether an applicable protocol exists in the data transfer apparatus or not is determined (S11). When there is not an applicable protocol (S11, No), an error processing such as displaying an error message to the user is performed (S12), the flow returns to step S6 and the process steps are repeated. When there is an applicable protocol (S11, Yes), a transfer command is issued to the counterpart equipment (S13). Dependent on the attribute, an appropriate transfer command may be selected and issued. Data from the counterpart equipment is received (S14). If the received data is a file, the application performs processing such as recording on a recording medium, display on the display monitor, data conversion or printing. The received data may be transmitted to an external equipment.

Figure 7:
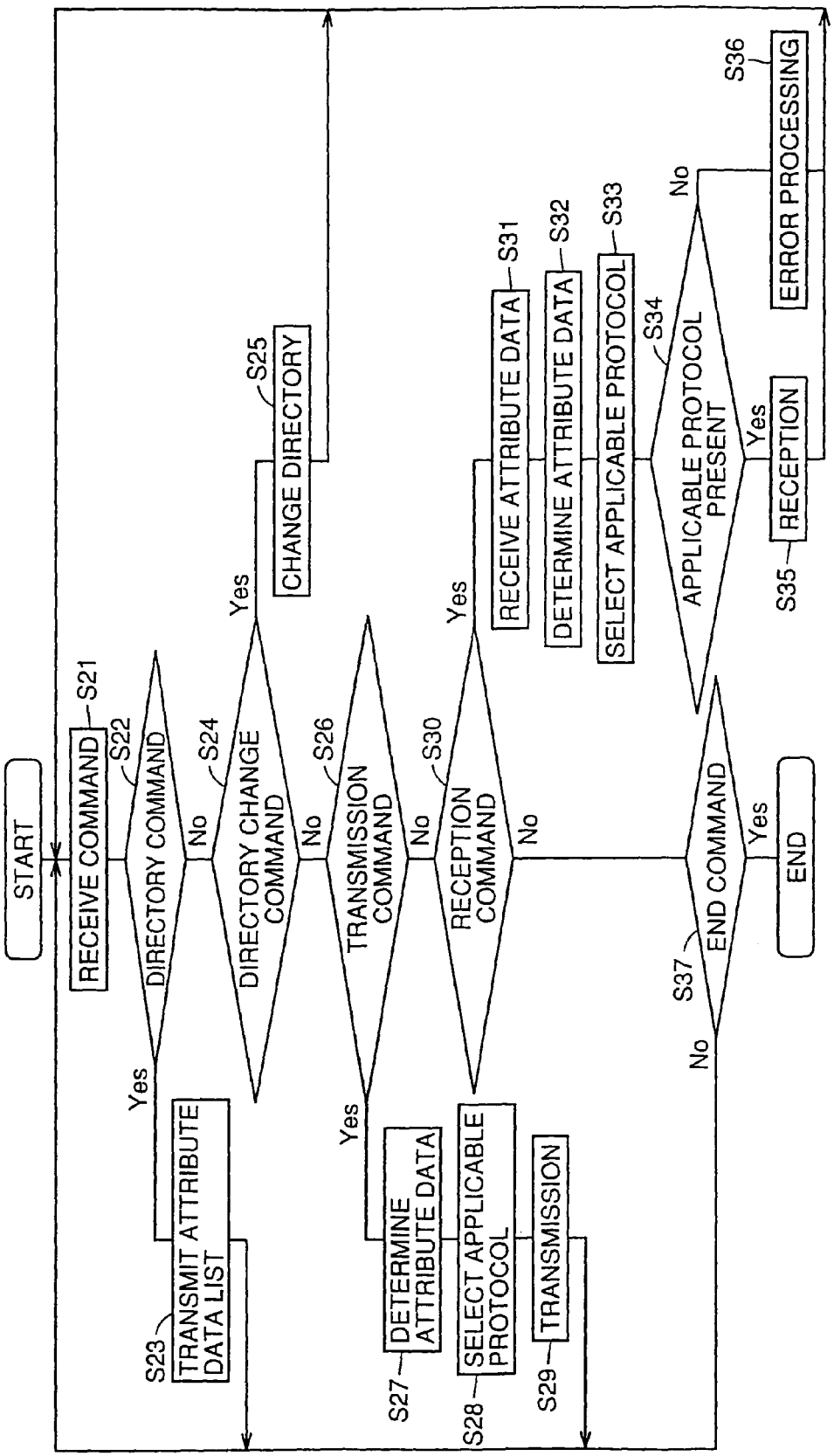
FIG. 7 is a flow chart representing a process procedure of command reception by the data transfer apparatus in accordance with one embodiment of the present invention.

FIG. 7 is a flow chart representing the process procedure of command reception by the data transfer apparatus in accordance with an embodiment of the present invention. First, command control unit 201 receives a command through the network (S21). Before the process of step S21, notification of a receivable command set or protocol may be made to the transmitting side equipment, or a connection may be established.

Thereafter, command control unit 201 determines whether the received command is a directory command or not (S22). If the received command is a directory command (S22, Yes), attribute transmitting unit 29 reads attribute data list stored in equipment attribute storing unit 32, and transmits the same to that equipment which issued the directory command, through command control unit 201 (S23). Attribute transmitting unit 29 is for transmitting, when a directory command is received, attribute data belonging to lower layer from the present directory position. Though attribute data managed in hierarchical manner is described, the attribute data may be managed by some fixed unit, not in a hierarchical manner.

If the received command is not a directory command (S22, No), command control unit 201 determines whether the received command is a directory change command (S24). If the received command is a directory change command (S24, Yes), the position of the present directory is moved to an upper or lower layer. If the received command is not a directory change command (S24, No), command control unit 201 determines whether the received command is a transmission command (S26). If the received command is a transmission command (S26, Yes), command control unit 201 extracts information designating transmission data associated with the transmission command (for example, attribute data such as name), determines appropriate protocol, command set and the like for data transfer based on the attribute data (S27), and switches by transfer switching unit 202 the protocol (S28). Data transmission unit 30 transmits data corresponding to the transmission command (S29).

If the received command is not a transmission command (S26, No), command control unit 201 determines whether the received command is a reception command or not (S30). If the received command is a reception command (S30, Yes), command control unit 201 receives attribute data from the command (S31) and determines an appropriate protocol from the attribute data (S32). The protocol is switched by transfer switching unit 202 (S33). If there is not an applicable protocol (S34, No), an error processing such as notification of error to that equipment which issued the command is performed (S36). If there is an applicable protocol (S34, Yes), data is received from that equipment which issued the command (S35). Computer body 1 performs a predetermined process such as displaying the received data on graphic display apparatus 2 or recording the received data in hard disk 13.

Figure 8:
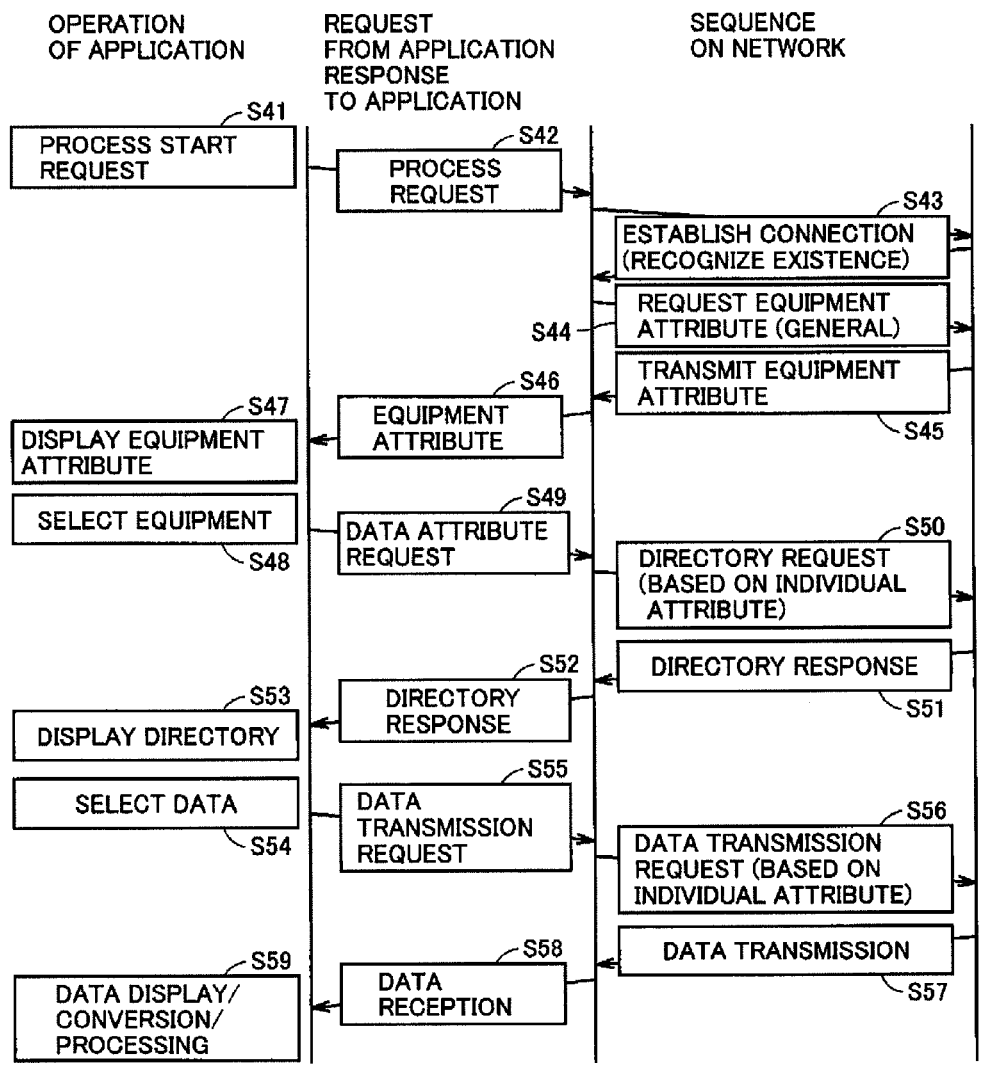
FIG. 8 represents an example of sequences implemented by the data transfer apparatus in accordance with one embodiment of the present invention.

FIG. 8 represents an example of a sequence of the data transfer apparatus in accordance with an embodiment. Referring to FIG. 8, among three vertical lines, the leftmost line represents an application program, and blocks on the left of the line represent operations performed by the application program. The central line represents the data transfer apparatus incorporated in computer body 1, and blocks between the leftmost line and the central line represent transmission/reception of data and commands between the application program and the data transfer apparatus incorporated in computer body 1. The rightmost line represents the data transfer apparatus incorporated in another equipment connected to the network, and blocks between the central line and the rightmost line represent information transmitted/received on the network. As the data transfer apparatus incorporated in computer body 1 manages data attribute information and attribute information of the counterpart equipment, it is possible for the application program to transmit/receive data, directory and the like by simply issuing a command common to various equipments connected to the network, regardless of the attribute information.

Upon reception of a process start request from a user (S41), the application program transmits a process request to the data transfer apparatus incorporated in computer body 1 (S42). Upon reception of the process request, the data transfer apparatus performs a connecting process to the counterpart equipment (S43). The connecting process refers not only to establishment of connection with the counterpart equipment but also a process of confirming existence of the counterpart equipment and so on.

When the connection is established, the data transfer apparatus incorporated in computer body 1 requests equipment attribute from the counterpart equipment (S44). Receiving the equipment attribute information from the counterpart equipment (S45), the data transfer apparatus transmits the equipment attribute information to the application program (S46). The application program displays the equipment attribute information on graphic display apparatus 2 (S47). The user selects a desired equipment from the equipment attribute information displayed on graphic display apparatus 2 (S48), and the application program requests attribute of the data managed by the equipment selected by the data transfer apparatus (S49).

The data transfer apparatus transmits a directory command to the counterpart equipment connected to the network to make a directory request (S59). The directory command is a command suitable for the counterpart equipment determined individually based on the attribute information of the equipment. When the directory information is received from the counterpart equipment (S51), the data transfer apparatus transmits the directory information to the application program (S52). The application program displays the obtained directory information on graphic display apparatus 2 (S53).

The user selects a desired directory among the directory information displayed on graphic display apparatus 2 (S54), and the application program transmits a data transmission request to the data transfer apparatus (S55). The data transfer apparatus selects a protocol in accordance with the data attribute information and equipment attribute information of the counterpart equipment, and issues a data transmission command (S56).

Upon reception of the data from the counterpart equipment (S57), the data transfer apparatus transmits the received data to the application program (S58). The application program executes a predetermined operation such as display of the received data from the counterpart equipment, data conversion or data processing (S59), and ends processing.

The application program and the data transfer apparatus may be operated on different processes, and data transmission/reception between the application program and the data transfer apparatus may be attained by interprocess communication.

Figure 9:
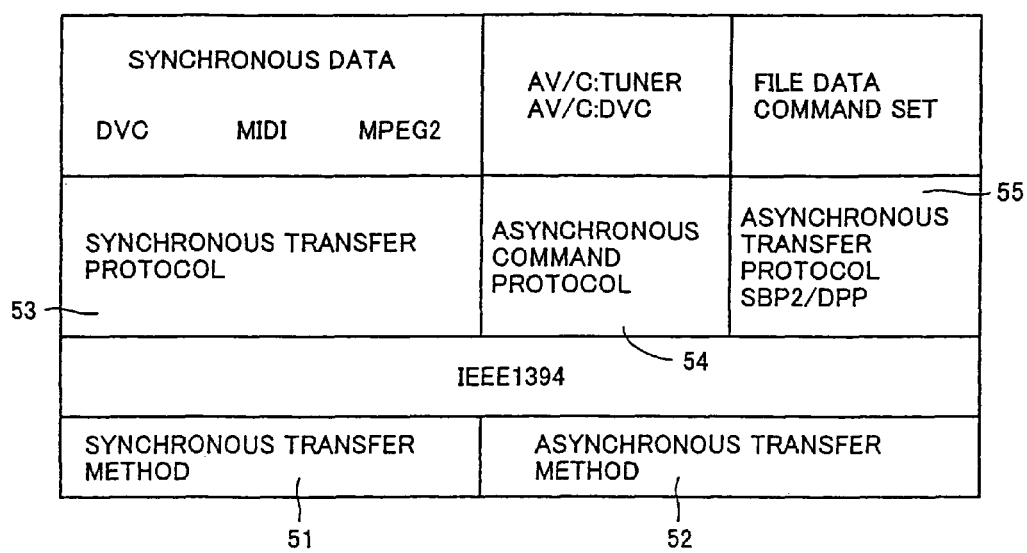
FIG. 9 represents hierarchy of common sets and protocols in accordance with serial bus IEEE1394.

FIG. 9 represents a hierarchy of protocols and command sets in accordance with the high speed serial bus IEEE1394 described above. As shown in FIG. 9, high speed serial bus standard alone has difference in transfer methods in the physical layer (synchronous transfer method 51/asynchronous transfer method 52), difference in application protocols thereabove (synchronous transfer protocols 53/asynchronous command protocol 54/SBP2 (Serial Bus Protocol 2)/DPP (Direct Print Protocol) 55), difference in packet formats, difference in command sets and difference in file formats. These differences have been handled separately. By the data transfer apparatus in accordance with the present embodiment, it becomes possible to handle equipments having these differences by the same operation. More specifically, it becomes possible for the user or the application program to transmit/receive data by the uniform, same operation, even when the counterpart equipment has different protocol or different command set.

An example in which the data transfer apparatus is incorporated in computer body 1 has been described above. Here, the data transfer program is executed by CPU 10 in computer body 1. In the following, a general configuration when the data transfer apparatus is incorporated in other equipment such as a television or DVD will be described.

Figure 10:
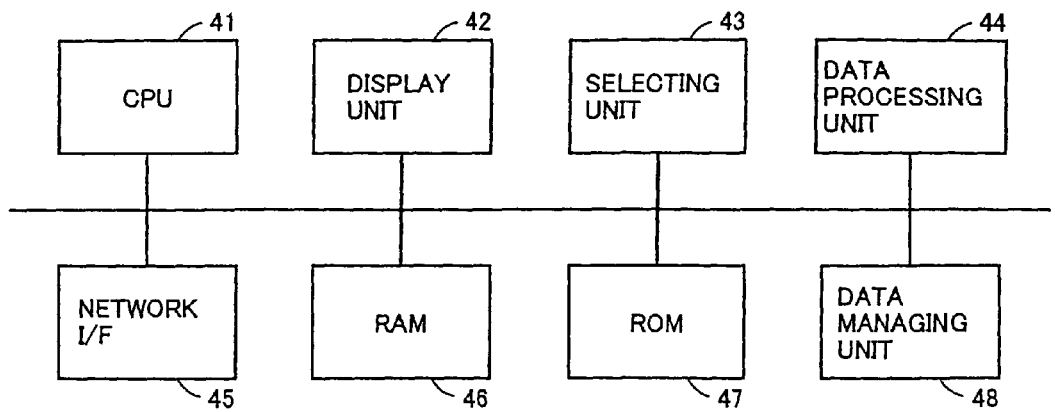
FIG. 10 is a block diagram schematically representing a configuration of a general data transfer apparatus.

FIG. 10 is a block diagram representing a schematic configuration of a general data transfer apparatus. The data transfer apparatus includes a CPU 41, a display unit 42 displaying attributes of data to be transferred and so on, a selecting unit 43 selecting data to be transferred, a data processing unit 44 processing the received data, a network I/F 45, an RAM 46, an ROM 47 and a data management unit 48 managing data of the equipment.

Data processing unit 44 and data managing unit 48 are implemented by programs recorded on RAM 46 or ROM 47, respectively. Data processing unit 44 and data managing unit 48 have the same functions as described with reference to FIG. 4. Therefore, detailed description thereof will not be repeated.

Figure 11:
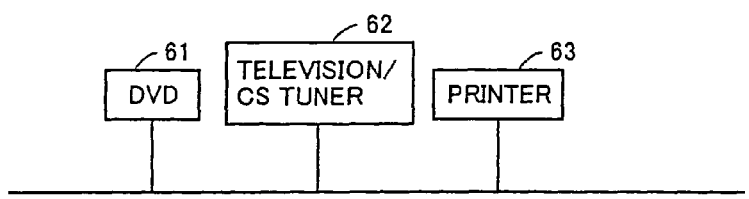
FIG. 11 represents an example of a network to which a DVD, a TELEVISION and a printer are connected.

FIG. 11 represents an example of a network to which a DVD 61, a television (CS (Communication Satellite) tuner) 62 and a printer 63 are connected. The data transfer apparatus described above is incorporated in the DVD 61, television 62 and the printer 63, and the user controls the DVD 61 and the printer 63 through the television 62.

Figure 12:
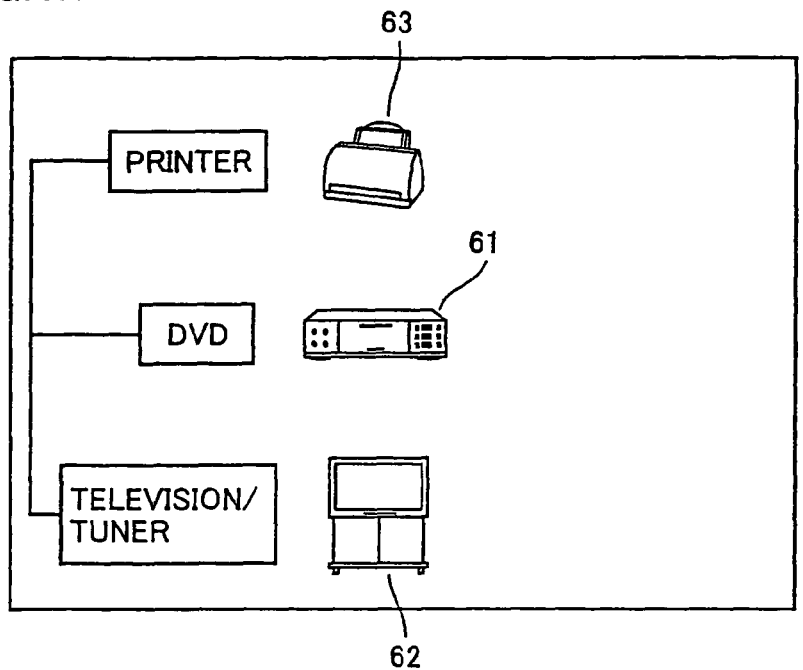
FIG. 12 represents a television screen displaying various controllable equipments.

FIG. 12 represents a television screen on which controllable equipments are displayed. The display may be given not on the television screen. For example, a display screen may be provided on a remote controller having bidirectional communication function, and the information may be displayed on the display screen.

Figure 13:
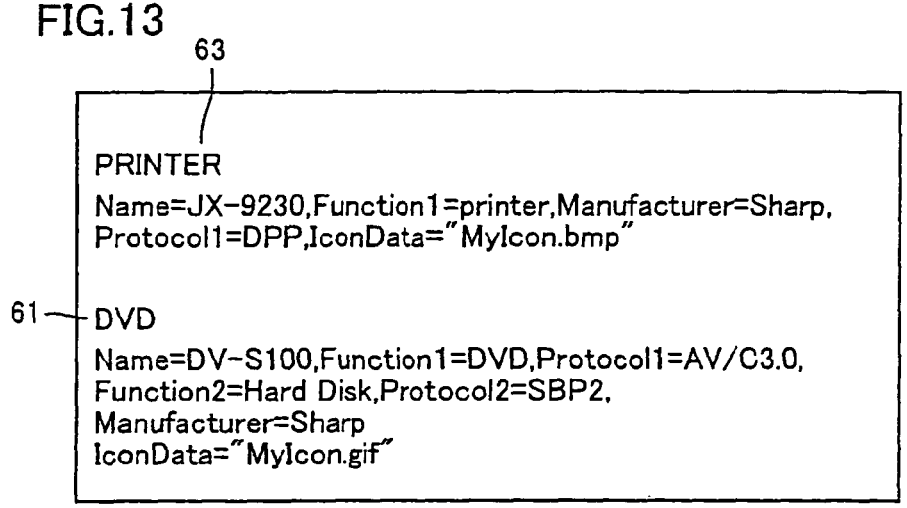
FIG. 13 represents attribute information of the equipments displayed on the screen of FIG. 12.

FIG. 13 represents attribute information of the equipments shown in FIG. 12. The first three lines represent attribute information of the printer 63, including name of the equipment, function of the equipment, manufacturer name, protocol name and file name of the icon. By the reference of a file name of the icon, the icon of each equipment is displayed on the television screen. The fourth and the following lines represent attribute information of the DVD 61.

According to IEEE 1394, attribute information of these equipments are written in an ROM contained in each of the equipments. Such attribute information must be prepared in an equipment utilizing infrared communication and not connected to the network, as well. If it is made possible to obtain attribute information in the form suitable for respective physical layers, equipments having different physical layers can be handled in the similar manner as those connected to the network.

Figure 14:
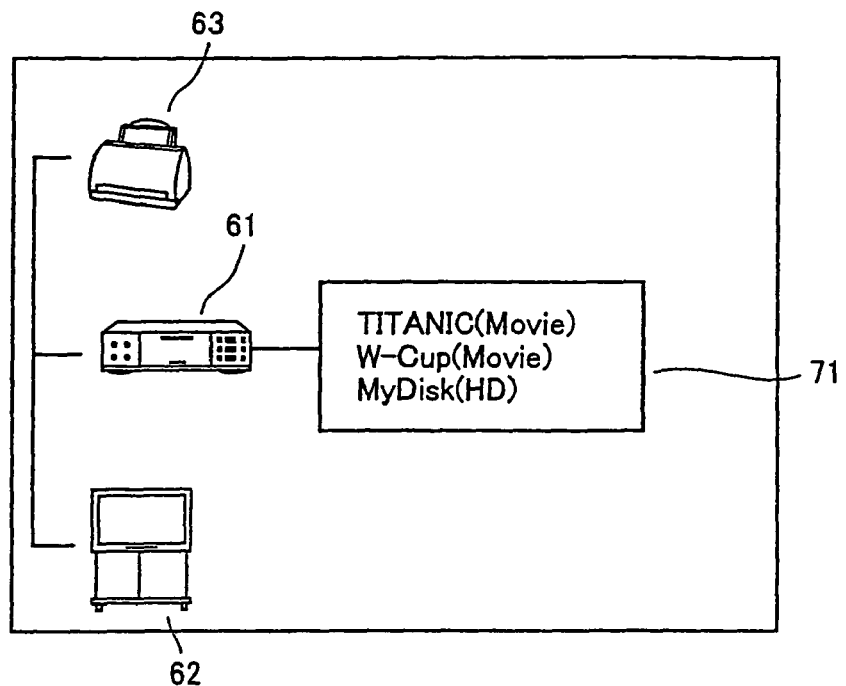
FIG. 14 shows a television screen when the DVD shown in FIG. 12 is selected.

FIG. 14 represents an example in which the DVD 61 displayed at the center of the television screen of FIG. 12 is selected, where accessible data or directory 71 is displayed on the side of the DVD icon 61. Information representing format is displayed in the parentheses of each directory 71 in FIG. 14. Date of generation, data size or the like may be displayed in the parentheses. A status file of the printer 63 may be displayed when the printer 63 is selected, and when an air conditioner, not shown, is selected, a file of a screen for setting of the operation may be displayed.

Figure 15:
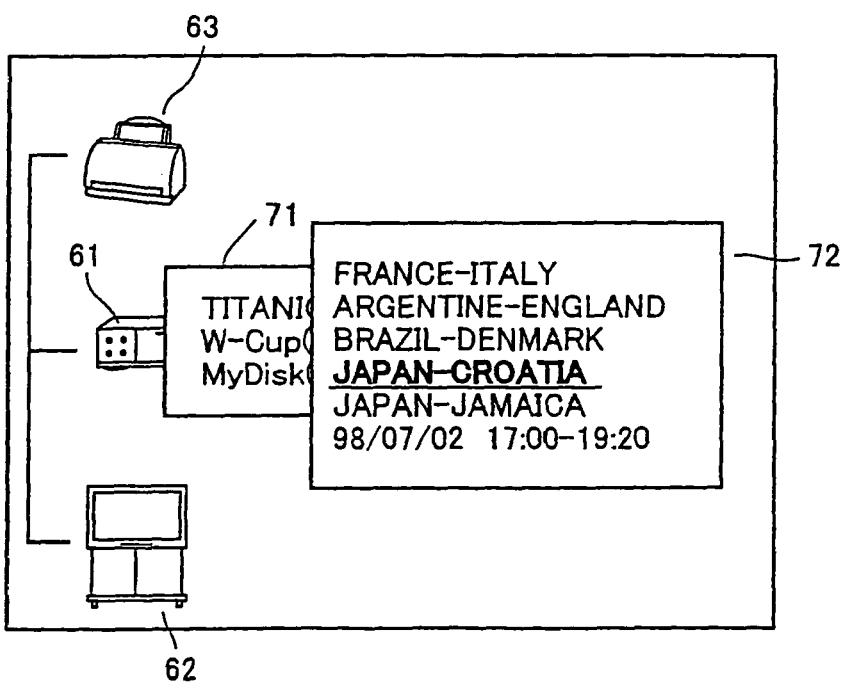
FIG. 15 represents a television screen when W-Cup is selected among the directories shown in FIG. 14.

FIG. 15 shows a television screen when "W-Cup" is selected among the directories 71 displayed in FIG. 14. The displayed directories 72 include titles already recorded (when the title is not clear, time of recording). Among the directories 72, a soccer game of "Japan-Croatia" is selected, and when the television 62 is selected as a receiving apparatus, the television 62 receives video data (MPEG2) of this game from the DVD 61 and provides screen display. According to IEEE1394, the connected DVD 61 operates by the AV/C command, and therefore, the command is transmitted from the television 62 to the DVD 61 and the operation of the DVD 61 starts. It is noted, however, that it is unnecessary for the user or the application program to know the contents of the command, in order to perform transmission/reception of the data.

Figure 16:
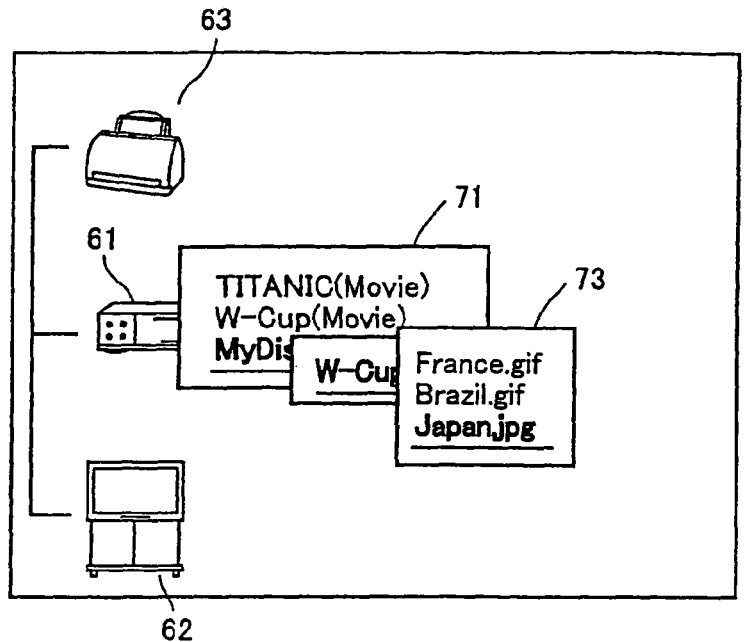
FIG. 16 represents a television screen when MyDisk is selected from the directories shown in FIG. 14.
Figure 17:
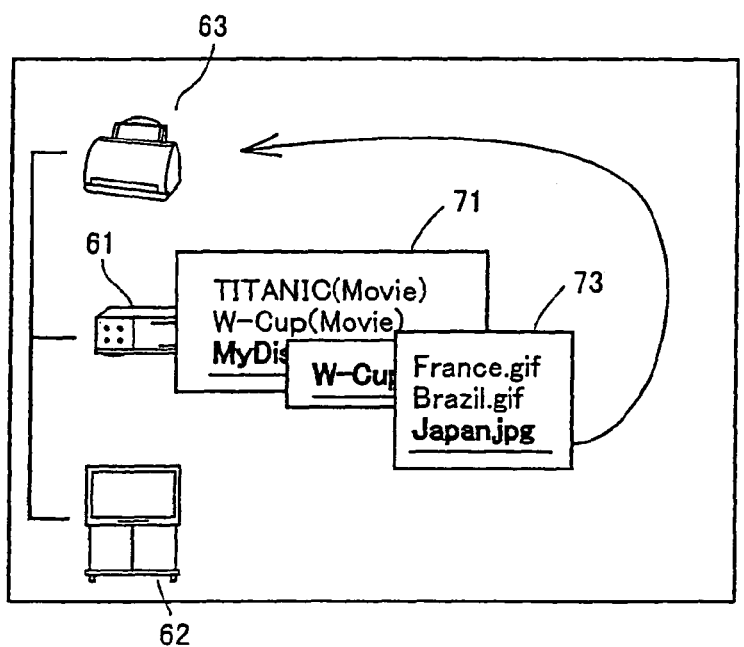
FIG. 17 represents a television screen when a file name Japan.jpg is selected from the directories of static images.

FIG. 16 shows a television screen when "MyDisk" is selected from the directories 71 displayed in FIG. 14 and "WCup" is selected from the directories 71 of still images displayed. According to IEEE1394, SBP2 is defined, for example, as a data transfer protocol by the hard disk. Therefore, a method of access different from that for the video data is necessary. For example, when a file name "Japan.jpg" is selected from the directories 73 of still images and the printer 63 is selected as the destination of transmission as shown in FIG. 17, a protocol for the printer 63, for example, DPP is used to transmit the data of the still image. The television 62 selects the protocol and the command set based on the attribute information of the printer equipment and the attribute information of the data to be transmitted (Japan.jpg), issues a data transmission command to the DVD 61, and issues a data reception command to the printer 63, whereby the data is transferred directly from the DVD 61 to the printer 63.

As to the FTP command of UNIX, the command must pass through the equipment (television 62) which issues a control request, as the communication is realized by transmission/reception between the equipment (television 62) issuing the control request and the equipment (DVD 61 or printer 63) controlled by the command. Compared with such communication, the data transfer apparatus in accordance with the present embodiment realizes direct transmission/reception of data between the DVD 61 and the printer 63, and hence the speed of processing can be improved.

Figure 18:
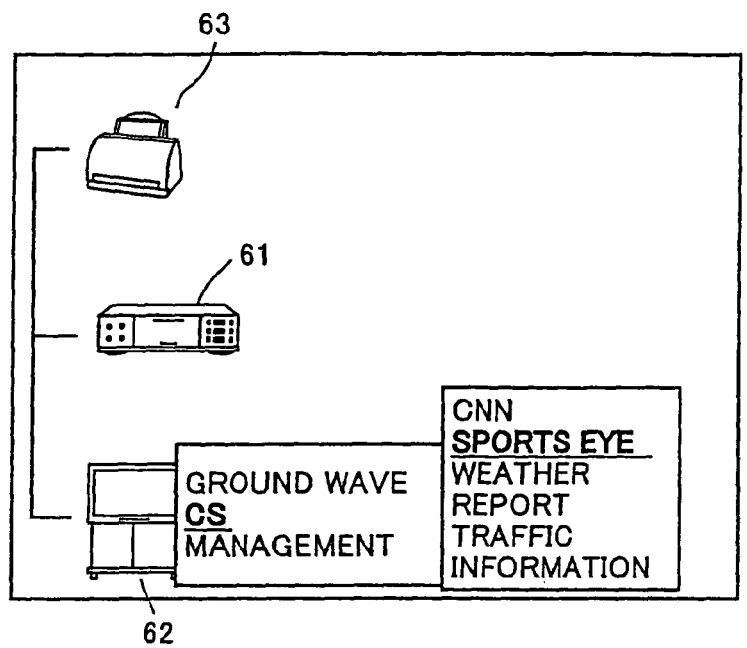
FIG. 18 represents a television screen when a television icon is selected and further CS broadcast is selected.

FIG. 18 shows an example of a television screen when a television icon is selected and further, CS broadcast is selected.

Figure 19:
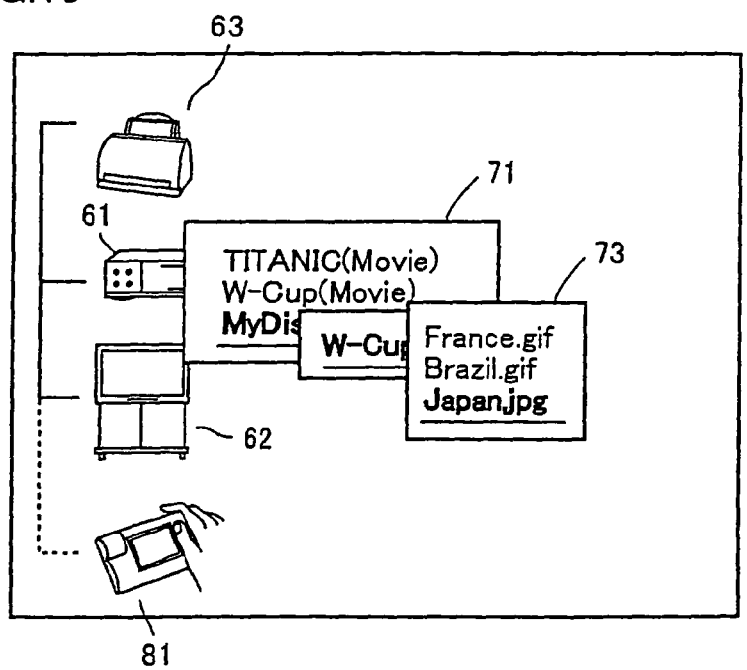
FIG. 19 represents an example of a television screen when a still camera is connected via infrared communication.

FIG. 19 shows an example of a television screen when a still camera 81 is connected via infrared communication. As the still camera is connected not by the network (by infrared communication), the connection is represented by a dotted line. When a plurality of physical layers or protocols are handled, it may be possible to indicate the difference by different thickness of characters, different thickness of lines, different types or different colors of lines, and the difference in transfer capability may be displayed by different thicknesses of lines, so as to allow the user to instinctively determine what equipment should be used to avoid long operation time, for example. In that case, communication interface (corresponding to network I/F of FIG. 3) corresponding to a plurality of physical layers is necessary.

As described above, by the data transfer apparatus in accordance with the present embodiment, it becomes possible for the application program or the user to perform data transmission/reception by the same operation even when data is to be transmitted/received between equipments having different protocols or different command sets connected to the network.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data receiving apparatus incorporated in a computer, comprising:
the computer performing equipment attribute information acquiring by requesting and receiving equipment attribute information from an equipment connected to a network;
the computer performing data attribute information acquiring by requesting and receiving data attribute information of the equipment from the equipment;
the computer performing said data attribute information acquiring by transmitting a directory command to the equipment, and receiving directory information from the selected equipment, where a directory is selected by the user;
the computer performing transfer selecting by selecting a transfer protocol in accordance with the data attribute information of the equipment and issuing a data transmission command for data for the equipment from the selected directory; and
the computer performing data receiving by receiving data from the selected directory by the selected transfer protocol.

2. The data receiving apparatus according to claim 1, wherein said data receiving unit receives data by a plurality of physical layers.

3. The data receiving apparatus according to claim 1, wherein said transfer selecting unit includes a command set selecting unit selecting a command set based on the data attribute information acquired by said data attribute information acquiring unit.

4. The data receiving apparatus according to claim 1, wherein said data attribute information acquiring unit acquires the data attribute information using a common protocol.

5. The data receiving apparatus according to claim 1, wherein the equipment attribute information includes at least one of a name of the equipment, a name of its function, a manufacturer's name, a processible protocol, icon information, and a current state.

6. The data receiving apparatus according to claim 1, wherein the data attribute information includes at least one of a file name, a data format, a data size, icon information, protocol information, description of contents, and a creation date.

7. The data receiving apparatus according to claim 1, further comprising an attribute displaying unit displaying all or some of the equipment attribute information and/or the data attribute information.

8. The data receiving apparatus according to claim 1, wherein the selected protocol includes at least a protocol for transferring a stream and a protocol for transferring a file.

9. The data receiving apparatus according to claim 1, wherein said data receiving apparatus is an AV reproducing apparatus performing reproduction of AV data.

10. The data receiving apparatus according to claim 1, wherein the equipment attribute information includes at least a name of its function and a processible protocol.

11. A data transfer apparatus incorporated in a computer, comprising:
the computer performing equipment attribute information transmitting by transmitting equipment attribute information of its own equipment to an equipment connected to a network;
the computer performing data attribute information transmitting transmitting data attribute information of each data item managed by its own equipment to the equipment connected to the network;
the computer performing command receiving by receiving a directory command from the equipment connected to the network, the directory command including a data attribute of the equipment connected to the network;
the computer performing transfer selecting by selecting a transfer protocol from a plurality of transfer protocols in accordance with data attribute information included in the directory command; and
the computer performing data transmitting by transmitting data to the equipment connected to the network by the transfer protocol selected by said transfer selecting unit.

12. The data transfer apparatus according to claim 11, wherein said data transmitting unit transmits data by a plurality of physical layers.

13. The data transfer apparatus according to claim 11, wherein said transfer selecting unit includes a command set selecting unit selecting a command set based on the data attribute information included in the command.

14. The data receiving apparatus according to claim 11, wherein the data attribute information includes at least one of a file name, a data format, a data size, icon information, protocol information, description of contents, and a creation date.

15. A data receiving apparatus incorporated in a computer, comprising:
the computer performing equipment attribute information transmitting by transmitting equipment attribute information of its own equipment to an equipment connected to a network;
the computer performing command receiving by receiving a directory command from one of the equipments to which said equipment attribute information was transmitted, the directory command including a data attribute of the equipment connected to the network;

the computer performing receiving selecting by selecting a receiving protocol from a plurality of receiving protocols in accordance with the data attribute information included in the directory command; and the computer performing data receiving by receiving data from said equipment from which the directory command is received by said selected receiving method.

16. A data transfer apparatus incorporated in a computer, comprising:

the computer performing equipment attribute information acquiring by requesting and receiving equipment attribute information from an equipment connected to a network;

the computer performing equipment selecting by selecting one of the equipments of which said equipment attribute information was acquired;

the computer performing transfer selecting by selecting a transfer protocol in accordance with a transfer method associated with the selected equipment, and selecting the corresponding transfer method;

the computer performing directory command transmitting by transmitting a directory command including said selected transfer method information to said selected equipment; and the computer performing data transmitting by transmitting data to the selected equipment by said selected transfer protocol.

17. The data transfer apparatus according to claim 16, further comprising an attribute display unit displaying some or all of said acquired equipment attribute information.

18. A data receiving apparatus incorporated in a computer, comprising:

the computer performing equipment attribute information acquiring by requesting and receiving equipment attribute information from an equipment connected to a network;

the computer performing data attribute information acquiring by transmitting a directory command to the equipment, and requesting and receiving data attribute information of each data item managed by at least one of the equipments of which said equipment attribute information was acquired, said data attribute information including a command set for an associated equipment;

the computer performing said data attribute information acquiring by transmitting a directory command to the equipment, and receiving directory information from the equipment, where a directory is selected by a user;

the computer performing command set selecting by selecting a command set from a plurality of command sets in accordance with equipment attribute information and the data attribute information of the data item of said received data attribute information; and the computer performing command transmitting by transmitting a command included in the command set selected by said command set selecting unit to any of the equipments of which said equipment attribute information was received.

19. A data receiving method, comprising:

requesting and receiving by a computer performing equipment attribute information acquiring by acquiring equipment attribute information from an equipment connected to a network;

requesting by a computer performing data attribute information acquiring by acquiring data attribute information of each data item managed by at least one equipment of which said equipment attribute information was acquired, said data attribute information including a data transfer protocol for an associated data item;

transmitting by a computer directory command, and requesting and receiving directory information from the equipment, where a directory is selected by a user;

selecting by a computer performing transfer method selecting by selecting a data transfer protocol in accordance with said acquired data attribute information of the selected equipment among said directory information and issuing a data transmission command for data for the equipment from the selected directory; and receiving by a computer performing data receiving by receiving data from the selected directory by the selected transfer protocol.

20. A non-transitory computer-readable storage medium having stored thereon a computer executable program for executing a data receiving method, wherein said data receiving method includes requesting and receiving equipment attribute information from an equipment connected to a network;

requesting and receiving data attribute information of the equipment from the equipment;

transmitting a directory command to the equipment and receiving directory information from the selected equipment, where a directory is selected by the user;

selecting a data transfer protocol in accordance with the data attribute information of the selected equipment and issuing a transmission command for data for the equipment from the selected directory; and receiving data from the selected directory by the selected transfer protocol.

21. A data transfer method, comprising:

transmitting by a computer performing equipment attribute information transmitting by transmitting equipment attribute information of its own equipment to an equipment connected to a network;

transmitting by a computer performing data attribute information transmitting by transmitting data attribute information of each data item managed by its own equipment to the equipment connected to the network;

receiving by a computer performing command receiving by receiving a directory command from the equipment connected to the network, the directory command including a data attribute of the equipment connected to the network;

selecting by a computer performing transfer method selecting by a transfer protocol from a plurality of transfer protocols in accordance with data attribute information included in the directory command; and transmitting by a data transmitting unit data to the equipment connected to the network by said selected transfer protocol.

22. A non-transitory computer-readable storage medium having stored thereon a computer executable program for executing a data transfer method, wherein said data transfer method includes transmitting equipment attribute information of its own equipment to an equipment connected to a network;

transmitting data attribute information of each data item managed by its own equipment to the equipment connected to the network;

receiving a directory command from the equipment connected to the network, the directory command including a data attribute of the equipment connected to the network;

selecting a transfer protocol in accordance with data attribute information and issuing a data transmission included in the directory command; and transmitting data to the equipment connected to the network by said selected transfer protocol.

23. A data receiving method, comprising:

transmitting by a computer performing equipment attribute information transmitting by transmitting equipment attribute information of its own equipment to an equipment connected to a network;

receiving by a computer performing command receiving by receiving a directory command from one of the equipments to which said equipment attribute information was transmitted, the directory command including data attribute information of the equipment connected to the network;

selecting by a computer performing receiving method selecting by selecting a receiving protocol from a plurality of receiving protocols in accordance with attribute information included in the directory command; and receiving by a data receiving unit data from said directory by the receiving protocol.

24. A non-transitory computer-readable storage medium having stored thereon a computer executable program for executing a data receiving method, wherein said data receiving method includes transmitting equipment attribute information of its own equipment to an equipment connected to a network;

receiving a directory command from one of the equipments to which said equipment attribute information was transmitted, the directory command including data attribute information of the equipment connected to the network;

selecting a receiving protocol from a plurality of receiving protocols in accordance with data attribute information included in the directory command; and receiving data from said equipment from which the command is received by said selected receiving method.

* * * * *